United States Patent
Bidell et al.

(10) Patent No.: US 6,521,722 B1
(45) Date of Patent: Feb. 18, 2003

(54) GAS-PHASE POLYMERIZATION OF C2-C8-ALK-1-ENES

(75) Inventors: Wolfgang Bidell, Mutterstadt; Roland Hingmann, Ladenburg; Franz Langhauser, Ruppertsberg; Meinolf Kersting, Neustadt; Rainer Alexander Werner, Bad Dürkheim, all of (DE)

(73) Assignee: Basell Polypropylen GmbH, Mainz (DE)

(*) Notice: Subject to any disclaimer, the term of this patent is extended or adjusted under 35 U.S.C. 154(b) by 0 days.

(21) Appl. No.: 09/525,063

(22) Filed: Mar. 14, 2000

(30) Foreign Application Priority Data

Mar. 17, 1999 (DE) .......................... 199 12 011

(51) Int. Cl.7 .............................. C08F 2/34; C08F 10/00
(52) U.S. Cl. .............................. 526/88; 526/65; 526/72; 526/901; 526/905
(58) Field of Search .......................... 526/88, 901, 73, 526/65, 72, 905

(56) References Cited

U.S. PATENT DOCUMENTS

| 4,857,613 A | 8/1989 | Zolk et al. ................. 526/128 |
| 4,981,929 A | 1/1991 | Hussein et al. ............ 526/125 |
| 5,288,824 A | 2/1994 | Kerth et al. ................ 526/128 |

FOREIGN PATENT DOCUMENTS

| EP | 045977 | 2/1982 |
| EP | 171200 | 2/1986 |
| EP | 794200 | 9/1997 |

*Primary Examiner*—Fred Teskin
(74) *Attorney, Agent, or Firm*—Keil & Weinkauf

(57) ABSTRACT

In a process for the polymerization of $C_2$–$C_8$-alk-1-enes by means of a Ziegler-Natta catalyst system, in which polymerization is carried out from the gas phase in at least one reaction zone at from 40 to 120° C. and pressures of from 1 to 100 bar, the pressure and temperature in the reaction zone are set so that an operating point formed by these parameters in a pressure-temperature diagram is located at from 0.2 to 5.0 bar below the dew line of the respective reaction mixture above which condensation of the $C_2$–$C_8$-alk-1-enes occurs.

8 Claims, 2 Drawing Sheets

— Dew line
---- Lines at a distance of 0.5 and 2.5 bar to dew line
* Example
⨯ Comparative Example

GAS-PHASE POLYMERIZATION OF C2-C8-ALK-1-ENES

The present invention relates to a process for the polymerization of $C_2$–$C_8$-alk-1-enes by means of a Ziegler-Natta catalyst system, in which polymerization is carried out from the gas phase in at least one reaction zone at from 40 to 120° C. and pressures of from 1 to 100 bar.

Polymers of $C_2$–$C_8$-alk-1-enes can be prepared both by liquid-phase polymerization and by polymerization in a slurry or by gas-phase polymerization. Since the solid polymer formed can easily be separated from the gaseous reaction mixture, the polymerization is increasingly carried out from the gas phase. The polymerization is here carried out with the aid of a Ziegler-Natta catalyst system which usually comprises a titanium-containing solid component, an organic aluminum compound and an organic silane compound (EP-B 45 977, EP-A 171 200, U.S. Pat. Nos. 4,857,613, 5,288,824).

Polymers of $C_2$–$C_8$-alk-1-enes include the corresponding homopolymers, copolymers and also block or impact copolymers. The latter are usually mixtures of various homopolymers or copolymers of $C_2$–$C_8$-alk-1-enes which display, in particular, a good impact catalyst. They are usually prepared in reactor cascades comprising at least two reactors connected in series and often in an at least two-stage process in which the polymer obtained in a first reactor is transferred in the presence of still active Ziegler-Natta catalyst constituents to a second reactor where further monomers are polymerized onto it.

In the exothermic polymerization of $C_2$–$C_8$-alk-1-enes, it is necessary to remove the heat of polymerization continuously and in a controlled manner. This is usually carried out by removing unreacted monomer mixtures from the reaction zone, then cooling them and subsequently reintroducing them into the reaction zone as cooled gaseous monomer mixtures. EP-B 89 691 discloses cooling the unreacted monomers removed from a fluidized-bed reactor to such an extent that they partly condense. The resulting mixture of gaseous and liquid monomers is then fed back into the lower part of the fluidized bed reactor.

To achieve a stable reaction and a good productivity of the Ziegler-Natta catalyst system used, the mixing behavior of the polymer bed present in the reactor is of critical importance. If mixing is insufficient, locally overheated zones frequently occur in the polymer bed in the reactor and these result in inhomogeneity of the reaction temperatures. Such inhomogeneous reaction temperatures lead, inter alia, to reduced productivity of the catalyst used and to a poorer morphology of the polymer obtained.

It is an object of the present invention to remedy the disadvantages indicated and to develop a process for the polymerization of $C_2$–$C_8$-alk-1-enes which is improved compared to the previously known processes and, inter alia, has an improved productivity of the catalyst used and leads to polymers having an improved morphology.

We have found that this object is achieved by a novel process for the polymerization of $C_2$–$C_8$-alk-1-enes by means of a Ziegler-Natta catalyst system, in which polymerization is carried out from the gas phase in at least one reaction zone at from 40 to 120° C. and pressures of from 1 to 100 bar, wherein the pressure and temperature in the reaction zone are set so that an operating point formed by these parameters in a pressure-temperature diagram is located at from 0.2 to 5.0 bar below the dew line of the respective reaction mixture above which condensation of the $C_2$–$C_8$-alk-1-enes occurs.

$C_2$–$C_8$-alk-1-enes which can be used in the process of the present invention are, in particular, ethylene, propylene, 1-butene, 1-pentene, 1-hexene, 1-heptene and 1-octene, with preference being given to using ethylene, propylene or 1-butene. The process is suitable for preparing homopolymers of the $C_2$–$C_8$-alk-1-enes or copolymers of the $C_2$–$C_8$-alk-1-enes, preferably containing up to 30% by weight of copolymerized, other alk-1-enes having up to 8 carbon atoms. For the purposes of the present invention, copolymers are both random copolymers and also block or impact copolymers.

In general, the process of the present invention is carried out in at least one reaction zone, frequently in two or more reaction zones, i.e. the polymerization conditions differ in the reaction zones so that polymers having different properties are produced. In the case of the homopolymers or random copolymers, this can be, for example, the molar mass, i.e. the molar mass distribution is broadened by preparing polymers having different molar masses in the reaction zones. Preference is given to polymerizing different monomers or monomer compositions in the reaction zones. This usually then leads to block or impact copolymers.

The process of the present invention is particularly suitable for preparing homopolymers of propylene or copolymers of propylene with up to 30% by weight of copolymerized, other alk-1-enes having up to 8 carbon atoms. The copolymers of propylene are here random copolymers or block or impact copolymers. If the copolymers of propylene have a random structure, they generally contain up to 15% by weight, preferably up to 6% by weight, of other alk-1-enes having up to 8 carbon atoms, in particular ethylene, 1-butene or a mixture of ethylene and 1-butene.

The block or impact copolymers of propylene are polymers in the case of which a propylene homopolymer or a random copolymer of propylene with up to 15% by weight, preferably up to 6% by weight, of other alk-1-enes having up to 8 carbon atoms is prepared in the first stage and then, in the second stage, a propylene-ethylene copolymer having an ethylene content of from 15 to 80% by weight, where the propylene-ethylene copolymer can additionally comprise further $C_4$–$C_8$-alk-1-enes, is polymerized on. In general, the propylene-ethylene copolymer is polymerized on in such an amount that the copolymer produced in the second stage makes up from 3 to 60% by weight of the end product.

According to the present invention, the polymerization is carried out by means of a Ziegler-Natta catalyst system. Here, use is made, in particular, of catalyst systems comprising a titanium-containing solid component a) plus cocatalysts in the form of organic aluminum compounds b) and electron donor compounds c).

However, Ziegler-Natta catalyst systems based on metallocene compounds or based on polymerization-active metal complexes can also be used in the process of the invention.

To prepare the titanium-containing solid component a), the halides or alkoxides of trivalent or tetravalent titanium are generally used as titanium compounds. Here, it is also possible to use titanium alkoxyhalide compounds or mixtures of various titanium compounds. Preference is given to using titanium compounds which contain chlorine as halogen. Preference is likewise given to titanium halides which, apart from titanium, contain only halogen, and among these especially the titanium chlorides and in particular titanium tetrachloride.

The titanium-containing solid component a) preferably comprises at least one halogen-containing magnesium compound. In this context, halogen is chlorine, bromine, iodine or fluorine, with preference being given to bromine and in particular chlorine. The halogen-containing magnesium compounds are either used directly in the preparation of the titanium-containing solid component a) or are formed during its preparation. Magnesium compounds which are suitable for preparing the titanium-containing solid component a) are especially the magnesium halides, in particular magnesium dichloride or magnesium dibromide, or magnesium compounds from which the halides can be obtained in a customary fashion, e.g. by reaction with halogenating agents, for example magnesium alkyls, magnesium aryls, magnesium alkoxy or magnesium aryloxy compounds or Grignard compounds. Preferred examples of halogen-free compounds of magnesium which are suitable for preparing the titanium-containing solid component a) are n-butylethylmagnesium or n-butyloctylmagnesium. Preferred halogenating agents are chlorine or hydrogen chloride. However, the titanium halides can also serve as halogenating agents.

In addition, the titanium-containing solid component a) advantageously further comprises electron donor compounds, for example monofunctional or polyfunctional carboxylic acids, carboxylic anhydrides or carboxylic esters, also ketones, ethers, alcohols, lactones or organophosphorus or organosilicon compounds.

As electron donor compounds within the titanium-containing solid component, preference is given to using carboxylic acid derivatives and in particular phthalic acid derivatives of the formula (II)

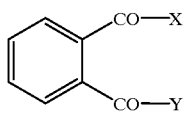

(II)

where X and Y are each a chlorine or bromine atom or a $C_1$–$C_{10}$-alkoxy radical or together represent oxygen in an anhydride function. Particularly preferred electron donor compounds are phthalic esters in which X and Y are each a $C_1$–$C_8$-alkoxy radical. Examples of phthalic esters which are preferably used are diethyl phthalate, di-n-butyl phthalate, di-iso-butyl phthalate, di-n-pentyl phthalate, di-n-hexyl phthalate, di-n-heptyl phthalate, di-n-octyl phthalate and di-2-ethylhexyl phthalate.

Further preferred electron donor compounds within the titanium-containing solid component are diesters of 3- or 4-membered, substituted or unsubstituted cycloalkyl-1,2-dicarboxylic acids and also monoesters of substituted benzophenone-2-carboxylic acids or substituted benzophenone-2-carboxylic acids. As hydroxy compounds for preparing the esters, preference is given to using the alkanols customary in esterification reactions, for example $C_1$–$C_{15}$-alkanols or $C_5$–$C_7$-cycloalkanols which may in turn bear one or more $C_1$–$C_{10}$-alkyl groups; also $C_6$–$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of the electron donor compounds per mol of magnesium compound.

In addition, the titanium-containing solid component a) can further comprise inorganic oxides as support. The support used is generally a finely divided inorganic oxide having a mean particle diameter of from 5 to 200 µm, preferably from 20 to 70 µm. In the present context, the mean particle diameter is the volume-based mean (median) of the particle size distribution determined by Coulter Counter analysis.

The grains of the finely divided inorganic oxide are preferably composed of primary particles having a mean particle diameter of from 1 to 20 µm, in particular from 1 to 5 µm. The primary particles are porous, granular oxide particles which are generally obtained by milling a hydrogel of the inorganic oxide. It is also possible to sieve the primary particles prior to processing them further.

Furthermore, the inorganic oxide to be used preferably also has voids or channels having a mean diameter of from 0.1 to 20 µm, in particular from 1 to 15 µm, whose macroscopic proportion by volume in the total particle is in the range from 5 to 30%, in particular from 10 to 30%.

The mean particle diameter of the primary particles and the macroscopic proportion by volume of the voids and channels in the inorganic oxide are advantageously determined by image analysis using scanning electron microscopy or electron probe microanalysis, in each case on grain surfaces and grain cross sections of the inorganic oxide. The images obtained are analyzed and the mean particle diameters of the primary particles and the macroscopic proportion by volume of the voids and channels are determined. The image analysis is preferably carried out by converting the electron micrographic data material into a halftone binary image and digital analysis by means of a suitable EDP program, e.g. the software package Analysis from SIS.

The preferred inorganic oxide can be obtained, for example, by spraydrying the milled hydrogel which is for this purpose mixed with water or an aliphatic alcohol. Such finely divided inorganic oxides are also commercially available.

The finely divided inorganic oxide also usually has a pore volume of from 0.1 to 10 cm$^3$/g, preferably from 1.0 to 4.0 cm$^3$/g, and a specific surface area of from 10 to 1000 m$^2$/g, preferably from 100 to 500 m$^2$/g; the values specified here are those determined by mercury porosimetry in accordance with DIN 66133 and by nitrogen adsorption in accordance with DIN 66131.

It is also possible to use an inorganic oxide whose pH, i.e. the negative logarithm to the base 10 of the proton concentration, is in the range from 1 to 6.5 and in particular in the range from 2 to 6.

Suitable inorganic oxides are, in particular, the oxides of silicon, aluminum, titanium or one of the metals of main groups I and II of the Periodic Table. Apart from aluminum oxide or magnesium oxide or a sheet silicate, a particularly preferred oxide is silicon oxide (silica gel). It is also possible to use mixed oxides such as aluminum silicates or magnesium silicates.

The inorganic oxides used as support have water present on their surface. This water is partly physically bound by adsorption and partly chemically bound in the form of hydroxyl groups. Thermal or chemical treatment enables the water content of the inorganic oxide to be reduced or eliminated entirely. In a chemical treatment, use is generally made of customary desiccants such as SiCl$_4$, chlorosilanes or aluminum alkyls. The water content of suitable inorganic oxides is from 0 to 6% by weight. Preference is given to using an inorganic oxide in the form in which it is commercially available, without further treatment.

The magnesium compound and the inorganic oxide are preferably present in the titanium-containing solid component a) in such amounts that from 0.1 to 1.0 mol, in particular from 0.2 to 0.5 mol, of the compound of magnesium is present per mol of the inorganic oxide.

In the preparation of the titanium-containing solid component a), use is generally also made of $C_1$–$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof. Preference is given to using ethanol.

The titanium-containing solid component can be prepared by methods known per se. Examples are described, for example, in EP-A 45 975, EP-A 45 977, EP-A 86 473, EP-A 171 200, GB-A 2 111 066, U.S. Pat. Nos. 4,857,613 and 5,288,824. The process known from DE-A 195 29 240 is preferably employed.

Suitable aluminum compounds b) include, in addition to trialkylaluminum, compounds in which an alkyl group is replaced by an alkoxy group or by a halogen atom, for example by chlorine or bromine. The alkyl groups can be identical or different. It is possible for the alkyl groups to be linear or branched. Preference is given to using trialkylaluminum compounds whose alkyl groups each have from 1 to 8 carbon atoms, for example trimethylaluminum, triethylaluminum, tri-iso-butylaluminum, trioctylaluminum or methyldiethylaluminum or mixtures thereof.

In addition to the aluminum compound b), use is generally made of electron donor compounds c) as further cocatalysts. Examples of such electron donor compounds c) are monofunctional or polyfunctional carboxylic acids, carboxylic anhydrides or carboxylic esters, also ketones, ethers, alcohols, lactones and organophosphorus and organosilicon compounds. The electron donor compounds c) can be identical to or different from the electron donor compounds used for preparing the titanium-containing solid component a). Preferred electron donor compounds here are organosilicon compounds of the formula (I)

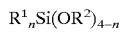

$$R^1{}_nSi(OR^2)_{4-n}$$

where $R^1$ are identical or different and are each a $C_1-C_{20}$-alkyl group, a 5- to 7-membered cycloalkyl group which may in turn bear $C_1-C_{10}$-alkyl groups as substituents, a $C_6-C_{18}$-aryl group or a $C_6-C_{18}$-aryl-$C_1-C_{10}$-alkyl group, $R^2$ are identical or different and are each a $C_1-C_{20}$-alkyl group and n is 1, 2 or 3. Particular preference is given to compounds in which $R^1$ is a $C_1-C_8$-alkyl group or a 5- to 7-membered cycloalkyl group and $R^2$ is a $C_1-C_4$-alkyl group and n is 1 or 2.

Among these compounds, particular mention should be made of dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane and dimethoxyisopropyl-sec-butylsilane.

The cocatalysts b) and c) are preferably used in such an amount that the atomic ratio of aluminum from the aluminum compound b) and titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The titanium-containing solid component a), the aluminum compound b) and the usually employed electron donor compound c) together form the Ziegler-Natta catalyst system. The catalyst constituents b) and c) can be introduced into the polymerization reactor together with the titanium-containing solid component a) or as a mixture or else individually in any order.

In the process of the present invention, it is also possible to use Ziegler-Natta catalyst systems based on metallocene compounds or based on polymerization-active metal complexes.

For the purposes of the present invention, metallocenes are complexes of transition metals with organic ligands which, together with compounds capable of forming metallocenium ions, give active catalyst systems. For use in the process of the present invention, the metallocene complexes are generally present in the catalyst system in supported form. Supports used are frequently inorganic oxides. Preference is given to the above-described inorganic oxides which are also used for preparing these titanium-containing solid components a).

Metallocenes which are usually used contain titanium, zirconium or hafnium as central atoms, with preference being given to zirconium. In general, the central atom is bound via a π bond to at least one, usually substituted, cyclopentadienyl group and to further substituents. The further substituents can be halogens, hydrogen or organic radicals, with preference being given to fluorine, chlorine, bromine or iodine or a $C_1-C_{10}$-alkyl group.

Preferred metallocenes contain central atoms which are bound via two π bonds to two substituted cyclopentadienyl groups, with particular preference being given to those in which substituents of the cyclopentadienyl groups are bound to both cyclopentadienyl groups. In particular, preference is given to complexes whose cyclopentadienyl groups are additionally substituted by cyclic groups on two adjacent carbon atoms.

Other preferred metallocenes are those containing only one cyclopentadienyl group which is, however, substituted by a radical which is also bound to the central atom.

Examples of suitable metallocene compounds are ethylenebis(indenyl)zirconium dichloride,
ethylenebis(tetrahydroindenyl)zirconium dichloride,
diphenylmethylene-9-fluorenylcyclopentadienylzirconium dichloride,
dimethylsilanediylbis(3-tert-butyl-5-methylcyclopentadienyl)-zirconium dichloride,
dimethylsilanediylbis(2-methylindenyl)zirconium dichloride,
dimethylsilanediylbis(2-methylbenzindenyl)zirconium dichloride,
dimethylsilanediylbis(2-methyl-4-phenylindenyl)zirconium dichloride,
dimethylsilanediylbis(2-methyl-4-naphthylindenyl) zirconium dichloride,
Dimethylsilanediylbis(2-methyl-4-isopropylindenyl) zirconium dichloride and
Dimethylsilanediylbis(2-methyl-4,6-diisopropylindenyl) zirconium dichloride and also the corresponding dimethylzirconium compounds.

The metallocene compounds are either known or are obtainable by methods known per se.

The metallocene catalyst systems further comprise compounds capable of forming metallocenium ions. Suitable compounds of this type are strong, uncharged Lewis acids, ionic compounds having Lewis acid cations or ionic compounds having Brönsted acids as cations. Examples are tris(pentafluorophenyl)borane, tetrakis(pentafluorophenyl) borate or salts of N,N-dimethylanilinium. Likewise suitable as compounds capable of forming metallocenium ions are open-chain or cyclic aluminoxane compounds. These are usually prepared by reaction of trialkylaluminum with water and are generally in the form of mixtures of both linear and cyclic chain molecules having different chain lengths.

In addition, the metallocene catalyst systems may comprise organometallic compounds of metals of main groups I, II and III of the Periodic Table, for example n-butyllithium, n-butyl-n-octylmagnesium or tri-iso-butylaluminum, triethylaluminum or trimethylaluminum.

The process of the present invention is carried out by polymerization in the gas phase in at least one reaction zone, frequently in two or more reaction zones connected in series (reactor cascade). It is possible to use the customary reactors used for the polymerization of $C_2$–$C_8$-alk-1-enes. Suitable reactors are, for example, continuously operated stirred vessels, loop reactors or fluidized-bed reactors. The size of the reactors is not of critical importance to the process of the present invention. It depends on the output which is to be achieved in the reaction zone or in the individual reaction zones.

Reactors used are, in particular, fluidized-bed reactors and also horizontally or vertically stirred powder-bed reactors. In the process of the present invention, the reaction bed generally comprises the polymer of $C_2$–$C_8$-alk-1-enes which is to be produced in the respective reactor.

In a particularly preferred embodiment, the process of the present invention is carried out in a reactor or in a cascade of reactors connected in series-in which the pulverulent reaction bed is kept in motion by means of a vertical stirrer. Here, unsupported helical stirrers are particularly well suited. Such stirrers are known, for example, from EP-B 000 512 and EP-B 031 417. They are particularly good at distributing the pulverulent reaction bed very homogeneously. Examples of such pulverulent reaction beds are described in EP-B 038 478. The reactor cascade preferably comprises two tank-shaped reactors connected in series, each provided with a stirrer and having a capacity of from 0.1 to 100 m$^3$, for example 12.5, 25, 50 or 75 m$^3$.

In the process of the present invention, the polymerization is carried out under customary reaction conditions at from 40 to 120° C. and pressures of from 1 to 100 bar. Preference is given to temperatures of from 40 to 100° C., in particular from 60 to 90° C., and pressures of from 10 to 50 bar, in particular from 20 to 40 bar. The molar mass of the $C_2$–$C_8$-alk-1-ene polymers formed can be controlled and set by addition of regulators customary in polymerization technology, for example hydrogen. Apart from such molar mass regulators, it is also possible to use catalyst activity regulators, i.e. compounds which influence the catalyst activity, as well as antistatics. The latter prevent the formation of deposits on the reactor wall as a result of electrostatic charging. The polymers of the $C_2$–$C_8$-alk-1-enes generally have a melt flow index (MFI) of from 0.1 to 3000 g/10 min, in particular from 0.2 to 100 g/10 min, at 230° C. and under a weight of 2.16 kg. The melt flow index corresponds to the amount of polymer which is pressed within 10 minutes from the test apparatus standardized in accordance with ISO 1133 at 230° C. and under a weight of 2.16 kg. Particular preference is given to polymers whose melt flow index is from 0.1 to 20 g/10 min at 230° C. and under a weight of 2.16 kg.

In the process of the present invention, the mean residence times of the gaseous $C_2$–$C_8$-alk-1-enes are in the range from 0.1 to 10 hours, preferably in the range from 0.2 to 5 hours and in particular in the range from 0.3 to 4 hours.

In the process of the present invention, it is important that the pressure and temperature in the individual reaction zones are set so that an operating point formed by these two parameters in a pressure-temperature diagram is located from 0.2 to 5 bar below the dew line of the respective reaction mixture above which condensation of the $C_2$–$C_8$-alk-1-enes occurs. The operation point formed by pressure and temperature in the pressure-temperature diagram is preferably from 0.5 to 2.5 bar below the dew line of the respective reaction mixture.

In the gas-phase polymerization, the operating points required for reliable and controlled operation are usually determined by means of the parameters pressure and temperature. These form a pressure-temperature diagram in which the temperatures are plotted toward the right (abscissa) and the pressures are plotted toward the top (ordinate). Such pressure-temperature diagrams are shown, for example, in FIGS. 1 and 2 for Examples 1 and 2 according to the present invention. For each individual gaseous reaction mixture of $C_2$–$C_8$-alk-1-enes and gaseous molar mass regulators, catalyst activity regulators or antistatics, there is in each case an individual characteristic dew line. Below this dew line, the individual constituents of the reaction mixture are present in the gaseous state and above the dew line they are present in the liquid state. If one moves vertically upward at a predetermined temperature in the pressure-temperature diagram by continuously increasing the pressure at constant temperature, condensation, i.e. liquefaction of the reaction mixture, is observed when one moves above the dew line.

According to the process of the present invention, the operating point for each gaseous reaction mixture in a reaction zone is selected so as to be located from 0.2 to 5.0 bar, in particular from 0.5 to 2.5 bar, below the dew line. This means that the operating point formed by pressure and temperature is located in the region of the pressure-temperature diagram in which the reaction mixture is gaseous but in the vicinity of the dew line above which condensation of the reaction mixture occurs.

The dew line applicable to each individual reaction mixture can be determined by means of a series of experiments in the reaction zone, in which the pressure is increased at a given temperature until condensation of the reaction mixture is observed. In this way, the respective dew pressure can be determined for a particular temperature in the reaction zone.

As an alternative, it is also possible to simulate the condensation behavior of the respective reaction mixture using suitable mathematical models, for example an equation of state based on virial coefficients in accordance with the Lee-Kesler-Plöcker model or as described by Redlich-Kwong. The thermophysical behavior of each constituent of the reaction mixture is described by its critical pressure (Pc), its critical temperature (Tc) and the Pitzer factor (w) which is known for about 2000 compounds or can be estimated from molecular increments. From the critical parameters (Pc, Tc) and the respective phase concentrations, it is possible to determine effective coefficients of the respective equation of state for the phase to be examined using mixing rules specific to the equation of state (Knapp, Döring, Öllrich, Plöcker, "Vapor-Liquid Equiibria for mixtures of low boiling substances", Chemical Data Series, Vol. 6, 1982, Dechema, Frankurt).

The compounds which have low vapor pressures have the greatest effect on the position of the dew line because they condense preferentially.

To calculate the characteristic dew pressure (P) for each temperature, the following system of equations has to be solved numerically at a prescribed temperature for each component of the reaction mixture:

$$\ln f_i^l = \ln f_i^v, \quad i = 1, n \tag{1a}$$

$$\sum_i^n (x_i - y_i) = 0 \tag{1b}$$

$$k_i = P_{ci}/P_e \cdot 5.37(1+w_i)(1-T_{ci}/T) \tag{2}$$

where:

f′i: Fugacity of the component i in the liquid state f″i: Fugacity of the component i in the gaseous state xi: Concentration of the component i in the liquid state yi: Concentration of the component i in the gaseous state ki: Phase distribution coefficient of the component i $$\left(ki = \frac{vi}{xi}\right)$$

Pc: Critical pressure of the component i

P: Dew pressure

Tci: Critical pressure of the component i

T: Dew temperature wi: Pitzer factor

After calculating the characteristic dew pressure (P) for each temperature by means of the system of equations (1a), (1b) and (2), a corresponding pressure-temperature diagram in which a dew line is drawn in can be determined for each reaction mixture. According to the process of the present invention, the operating points to be selected in each case are from 0.2 to 5 bar, in particular from 0.5 to 2.5 bar, below the dew line.

The process of the present invention enables, inter alia, the productivity of the catalyst system used to be significantly increased as a result of improved monomer diffusion behavior, heat diffusion behavior, admixing behavior in the reaction zones. A reduced tendency to form lumps and deposits in the reactor during the polymerization is also observed. The increased temperature homogeneity in the polymer bed avoids "hot spots", i.e. local overheating in the polymer bed. The $C_2$–$C_8$-alk-1-ene polymers obtained have, inter alia, an improved morphology, in particular reduced proportions of fine dust (particle size<0.125 mm).

The process of the present invention or the apparatus according to the present invention makes it possible to prepare various types of polymers of $C_2$–$C_8$-alk-1-enes, for example homopolymers, copolymers or mixtures of such polymers. These are especially suitable for producing films, fibers or moldings.

EXAMPLES

All experiments were carried out using a Ziegler-Natta catalyst system comprising a titanium-containing solid component a) prepared by the following method.

In a first step, a finely divided silica gel having a mean particle diameter of 30 µm, a pore volume of 1.5 cm³/g and a specific surface area of 260 m²/g was admixed with a solution of n-butyloctylmagnesium in n-heptane, using 0.3 mol of the magnesium compound per mol of $SiO_2$. The finely divided silica gel additionally had a mean particle size of the primary particles of 3–5 µm and contained voids and channels having a diameter of 3–5 µm. The macroscopic proportion by volume of the voids and channels in the total particle was about 15%. The suspension was stirred for 45 minutes at 95° C., then cooled to 20° C., after which 10 times the molar amount, based on the organomagnesium compound, of hydrogen chloride was passed in. After 60 minutes, the reaction product was admixed with 3 mol of ethanol per mol of magnesium while stirring continually. This mixture was stirred for 0.5 hour at 80° C. and subsequently admixed with 7.2 mol of titanium tetrachloride and 0.5 mol of di-n-butyl phthalate, in each case based on 1 mol of magnesium. The mixture was subsequently stirred for 1 hour at 100° C., the solid obtained in this way was filtered off and washed a number of times with ethylbenzene.

The solid product obtained as described above was extracted for 3 hours at 125° C. with a 10% strength by volume solution of titanium tetrachloride in ethylbenzene. The solid product was then separated from the extractant by filtration and washed with n-heptane until only 0.3% by weight of titanium tetrachloride were present in the washings.

The titanium-containing solid component $a_1$) contained 3.5% by weight of Ti 7.4% by weight of Mg 28.2% by weight of Cl.

In addition to the titanium-containing solid component a), use was made of triethylaluminum and dimethoxyisobutyl-isopropylsilane as cocatalysts, as in the teachings of U.S. Pat. Nos. 4,857,613 and 5,288,824.

Example 1

The polymerization was carried out in a vertically mixed gas-phase reactor having a utilizable capacity of 800 l fitted with an unsupported helical stirrer. The power drawn by the stirrer was measured in KW. The reactor contained an agitated fixed bed of finely divided polymer. The reactor pressure was 31.5 bar. As catalyst, use was made of the titanium-containing solid component a). The catalyst was metered in together with the fresh propylene added to regulate the pressure. The amount of catalyst metered in was such that the mean output of 150 kg of polypropylene per hour was maintained. In addition, 450 mmol/h of triethylaluminum (in the form of a 1 molar heptane solution) and 45 mmol/h of isobutylisopropyldimethoxysilane (in the form of a 0.25 molar heptane solution) were metered into the reactor. Hydrogen was metered in to regulate the molar mass. The hydrogen concentration in the reaction gas was 0.9% by volume and was determined by gas chromatography.

The heat of reaction generated in the polymerization was removed by evaporation cooling. For this purpose, a gas stream comprising from 4 to 6 times the amount of gas reacted was circulated. The vaporized propylene was, after passing through the reaction zone, taken off at the top of the reactor, freed of entrained polymer particles in a filter for the circulated gas and condensed in a heat exchanger cooled by secondary water. The condensed circulated gas was pumped back into the reactor at up to 40° C. The hydrogen which was not condensed in the condenser was drawn off by means of an ejector and fed back into the liquid circulated gas stream. The temperature in the reactor was regulated by means of the circulated gas flow and was measured as described in EP 0 038 478. The reactor temperature determined in this way was 71.50° C. The maximum temperature difference ($\Delta T_{max-min}$=0.8° C.) in the polymer bed was determined from the difference between the measurement points measuring the highest and lowest temperatures. Polymer powder was gradually removed from the reactor by brief venting of the reactor through a tube reaching down into it. The discharge frequency was regulated by means of a radiometric fill level measurement. The productivity was calculated from the chlorine content of the polymer using the following formula: P=Cl content of the catalyst/Cl content of the product. The polymer powder morphology was determined by sieve analysis, the melt flow index (MFI) was determined at 230° C. and 2.16 kg in accordance with ISO 1133 and the viscosity ($\eta$) was determined in decalin at 135° C. in accordance with ISO 1628.

The process parameters and characteristic product properties are shown in Table 1.

Comparative Example A

The polymerization was carried out in the continuous 800 l gas-phase reactor using a method similar to Example 1. The reactor pressure was 32 bar and the reactor temperature was 80° C.

The hydrogen concentration in the reaction gas was 0.6% by volume and was determined by gas chromatography.

The process parameters and characteristic product properties are shown in Table 1.

TABLE 1

|  | Example 1 | Comparative Example A |
|---|---|---|
| Reactor pressure [bar] | 31.5 | 32.0 |
| Reactor temperature [° C.] | 71.5 | 80.0 |
| Stirrer drive [KW] | 4.7 | 5.6 |
| $\Delta T_{max-min}$ [° C.] | 0.8 | 2.7 |
| $H_2$ [% by volume] | 0.9 | 0.6 |
| MFI [g/10 min] | 8.5 | 8.5 |
| [η] [dl/g] | 2.09 | 2.11 |
| Productivity [g of PP/g of cat] | 21500 | 18500 |
| Polymer powder morphology: |  |  |
| <0.125 mm [%] | 2.3 | 6.1 |
| 0.125–0.25 mm [%] | 7.1 | 5.8 |
| 0.25–0.5 mm [%] | 16.5 | 13.8 |
| 0.5–1.0 mm [%] | 29.9 | 41.2 |
| 1.0–2.0 mm [%] | 43.8 | 32.4 |
| >2.0 mm [%] | 0.4 | 0.7 |

Example 2

The polymerization in the continuous 800 l gas-phase reactor was carried out using a method similar to Example 1. The reactor pressure was 30 bar and the reactor temperature was 70° C. The hydrogen concentration in the reaction gas was 1.2% by volume and was determined by gas chromatography. In addition, 2.6% by volume of ethylene were metered into the reactor and the ethylene concentration was likewise determined by gas chromatography. The hourly sieve analysis of the discharged polymer particles of the propylene-ethylene copolymer formed indicated an average of 8.3 g of particles having a diameter greater than 5 mm per 20 kg of polymer powder. After 100 hours of stable gas-phase polymerization, the reactor was vented. Visual examination of the interior indicated no lumps and deposits in the reactor.

The process parameters and characteristic product properties are shown in Table 2.

Comparative Example B

The polymerization in the continuous 800 l gas-phase reactor was carried out using a method similar to Example 2. The reactor pressure was 23 bar and the reactor temperature was 80° C. The hydrogen concentration in the reaction gas was 0.8% by volume and was determined by gas chromatography. In addition, 2.5% by volume of ethylene were metered into the reactor and the ethylene concentration was likewise determined by gas chromatography. The hourly sieve analysis of the discharged polymer particles of the propylene-ethylene copolymer formed indicated an average of 475 g of particles having a diameter greater than 5 mm per 20 kg of polymer powder. After 100 hours of stable gas-phase polymerization, the reactor was vented and inspection of the interior revealed 3.8 kg of lumps and deposits on the stirrer helix.

The process parameters and characteristic product properties are shown in Table 2.

TABLE 2

|  | Example 2 | Comparative Example B |
|---|---|---|
| Reactor pressure [bar] | 30 | 23.0 |
| Reactor temperature [° C.] | 70.0 | 80.0 |
| $H_2$ [% by volume] | 1.2 | 0.8 |
| $C_2$ [% by volume] | 2.6 | 2.5 |
| MFI [g/10 min] | 2.2 | 2.2 |
| $C_2$ [% by weight] | 3.5 | 3.5 |
| [η] [dl/g] | 2.79 | 2.75 |
| Productivity [g of PP/g of cat] | 23000 | 17500 |
| Polymer powder morphology: |  |  |
| <0.125 mm [%] | 0.3 | 2.4 |
| 0.125–0.25 mm [%] | 1.3 | 6.3 |
| 0.25–0.5 mm [%] | 4.1 | 15.0 |
| 0.5–1.0 mm [%] | 16.8 | 31.9 |
| 1.0–2.0 mm [%] | 53.2 | 34.4 |
| >2.0 mm [%] | 24.3 | 10.0 |
| Number of particles having a particle diameter >5.0 mm in gram per 20 kg of polymer | 8.3 | 475.0 |

BRIEF DESCRIPTION OF THE DRAWINGS

Pressure-temperature diagrams with drawn-in dew lines and operating lines for Examples 1 and 2 and Comparative Examples A and B are shown in the two FIGS. 1 and 2 below. In each case, the pressure (p) is given in bar and the temperature (T) is given in °C.

Figure 1:
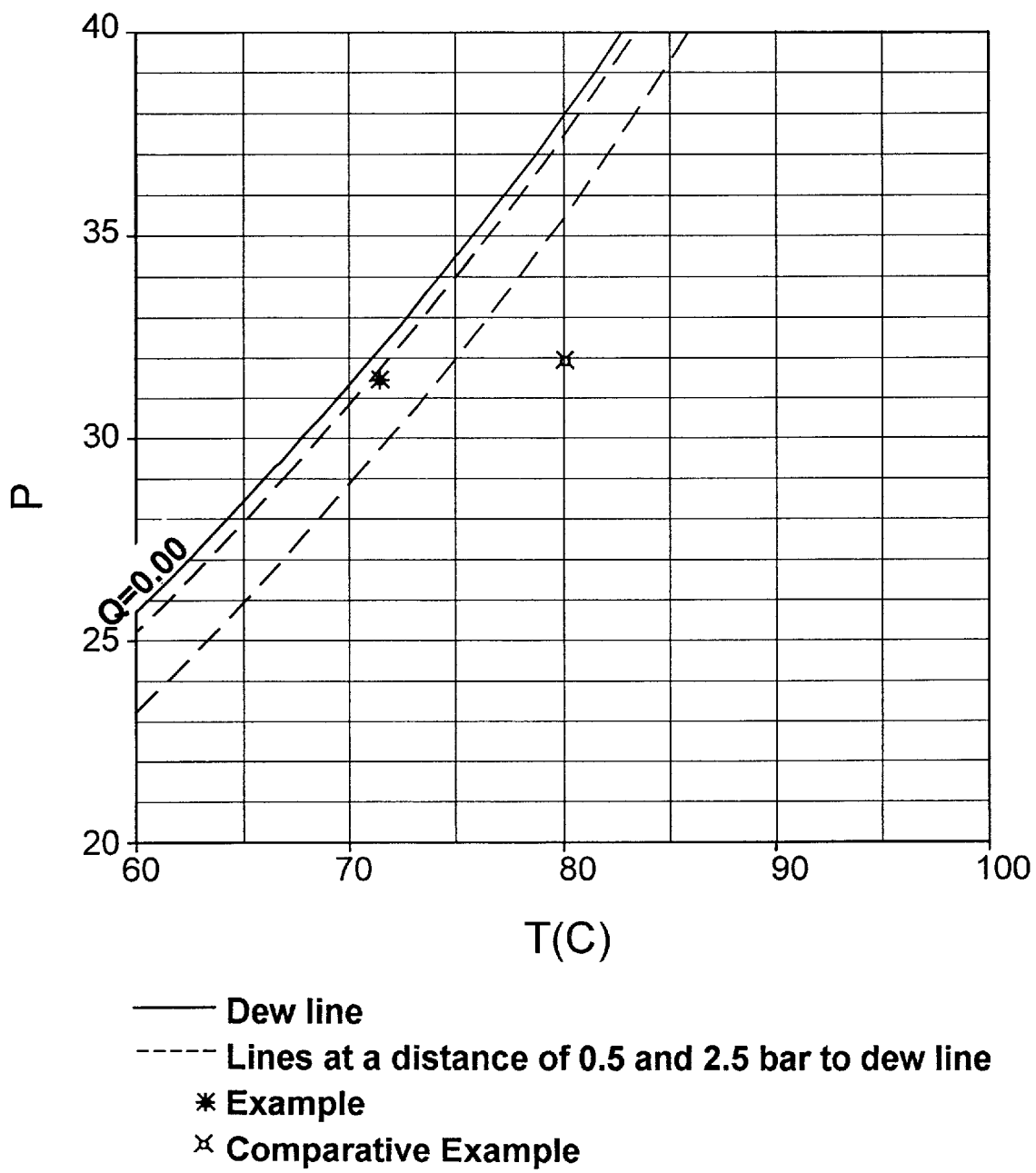
Figure 2:
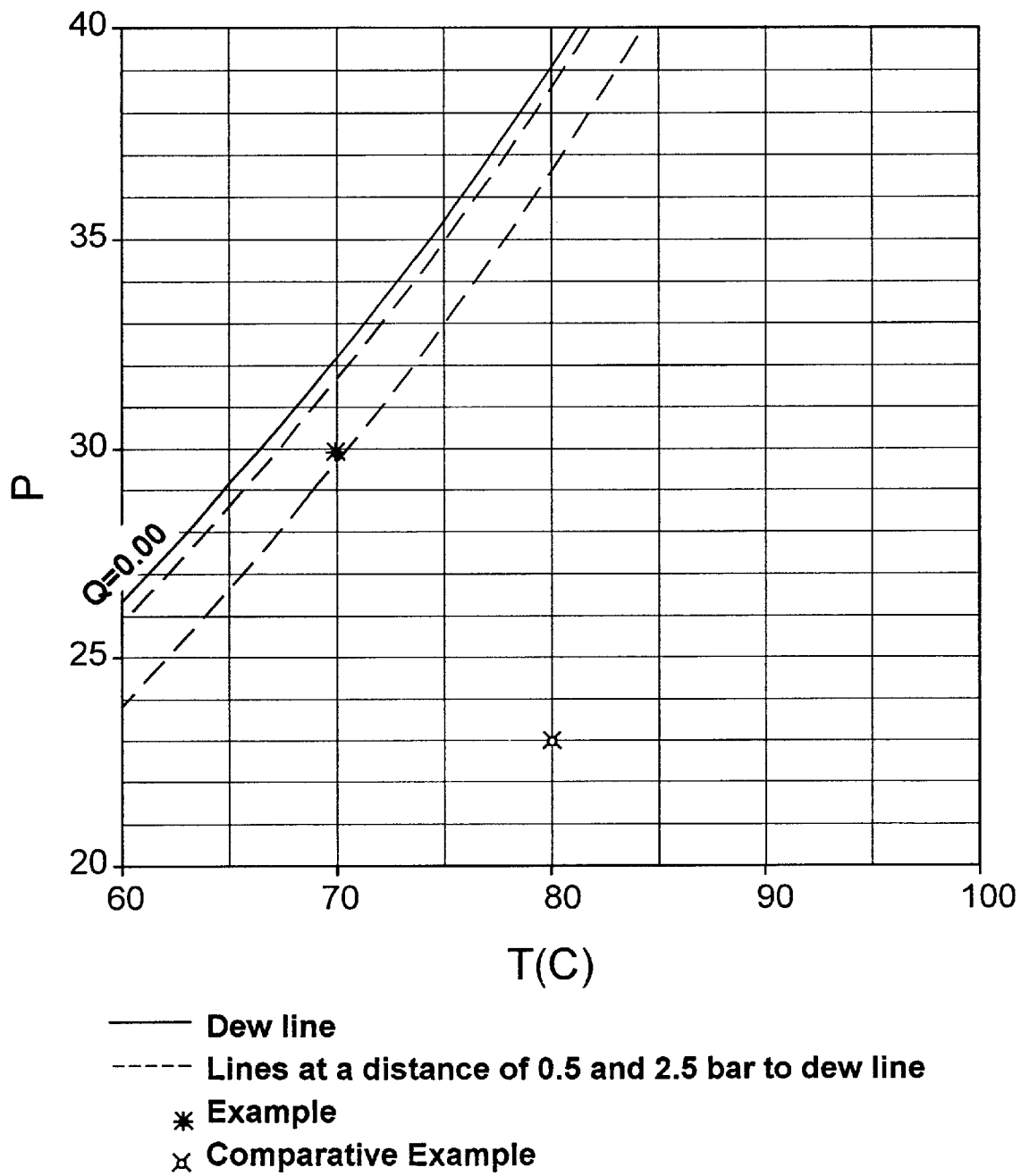

We claim:

1. A process for the polymerization of $C_2$–$C_8$-alk-1-enes by means of a Ziegler-Natta catalyst system, in which polymerization is carried out from the gas phase in at least one reaction zone at from 40 to 120° C and pressures of from 1 to 100 bar, wherein the pressure and temperature in the reaction zone are set so that an operating point formed by these parameters in a pressure-temperature diagram is located at from 0.2 to 5.0 bar below the dew line of the respective reaction mixture above which condensation of the $C_2$–$C_8$-alk-1-enes occurs, wherein the reaction zone is a stirred powder-bed reactor, and RCE-BIDELL et al., Ser. No. 09/525,063 wherein the Ziegler-Natta catalyst system comprises a titanium-containing solid component a) and also cocatalysts in the form of organic aluminum compounds b) and electron donor compounds c).

2. A process as claimed in claim 1, wherein the operating point is formed by pressure and temperature in the pressure-temperature diagram is located from 0.5 to 2.5 bar below the dew line of the respective reaction mixture.

3. A process as claimed in claim 1 used for preparing homopolymers of propylene.

4. A process as claimed in claim 1 used for preparing copolymers of propylene with subordinate amounts of other $C_2$–$C_8$-alk-1-enes.

5. A process as claimed in claim 1, wherein the polymerization is carried out at from 40 to 100° C.

6. A process as claimed in claim 1, wherein the polymerization is carried out at pressures of from 10 to 50 bar.

7. A process as claimed in claim 1, wherein the molar mass of the $C_2$–$C_8$-alk-1-ene polymers formed is set by means of hydrogen as regulator.

8. A process as claimed in claim 1, wherein the polymerization of the $C_2$–$C_8$-alk-1-enes is carried out in two reactors connected in series.

* * * * *

UNITED STATES PATENT AND TRADEMARK OFFICE
CERTIFICATE OF CORRECTION

PATENT NO.    : 6,521,722 B1
DATED         : February 18, 2003
INVENTOR(S)   : Bidell et al.

It is certified that error appears in the above-identified patent and that said Letters Patent is hereby corrected as shown below:

Column 12,
Lines 42-43, delete "RCE-BIDELL et al., Ser. No. 09/525,063".

Signed and Sealed this

Tenth Day of June, 2003

JAMES E. ROGAN
*Director of the United States Patent and Trademark Office*